United States Patent
Nguyen

(10) Patent No.: US 6,535,916 B1
(45) Date of Patent: Mar. 18, 2003

(54) SYSTEMS, METHODS AND COMPUTER PROGRAM PRODUCTS FOR LINKING TRANSACTIONS BY MULTIPLE WEB SITE SERVERS TO WEB SITE VISITORS

(75) Inventor: Binh Q. Nguyen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/428,930

(22) Filed: Oct. 28, 1999

(51) Int. Cl.⁷ .............................. G06F 15/173
(52) U.S. Cl. .................. 709/224; 709/203; 709/206; 709/226
(58) Field of Search .................. 709/224, 203, 709/223, 206, 207, 226, 227, 228, 229; 707/10

(56) References Cited

U.S. PATENT DOCUMENTS

| | | | |
|---|---|---|---|
| 5,761,436 A | * 6/1998 | Nielsen | 707/101 |
| 5,822,539 A | * 10/1998 | van Hoff | 709/203 |
| 5,838,682 A | * 11/1998 | Dekelbaum et al. | 370/401 |
| 5,848,412 A | * 12/1998 | Rowland et al. | 707/10 |
| 5,954,798 A | * 9/1999 | Shelton et al. | 709/223 |
| 6,175,838 B1 | * 1/2001 | Papierniak et al. | 707/203 |

FOREIGN PATENT DOCUMENTS

| | | | |
|---|---|---|---|
| JP | 10312323 | * | 11/1998 |
| JP | 11031129 | * | 2/1999 |

* cited by examiner

Primary Examiner—Ario Etienne
Assistant Examiner—LaShonda Jacobs
(74) Attorney, Agent, or Firm—Myers Bigel Sibley & Sajovec; A. Bruce Clay

(57) ABSTRACT

Systems, methods and computer program products are provided for linking a plurality of transactions performed by a plurality of servers at a Web site to a Web site visitor who initiates or is associated with the transactions. A Web server receiving a client request from a Web site visitor stores a record of the client request in a log file and attaches a unique record identification (RID) to the record if further processing is required. The Web server passes the unique RID to an Application server at the Web site along with the client request. The Application server stores a record of the Application server request in a log file associated with the Application server and attaches the RID to the record. The Application server passes the unique RID to a back-end server along with a request for the back-end server to perform an action. The back-end server stores a record of the Application server request in a log file associated with the back-end server and attaches the RID to the record.

30 Claims, 4 Drawing Sheets

SYSTEMS, METHODS AND COMPUTER PROGRAM PRODUCTS FOR LINKING TRANSACTIONS BY MULTIPLE WEB SITE SERVERS TO WEB SITE VISITORS

FIELD OF THE INVENTION

The present invention relates generally to Web sites and, more particularly, to analyzing Web site visitor activities.

BACKGROUND OF THE INVENTION

The Internet has gained broad recognition and acceptance as a viable medium for communicating and for conducting business. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), as well as image formats such as Graphics Interchange Format (GIF) and Joint Photographic Experts Group (JPEG).

A Web site is conventionally a related collection of Web files that includes a beginning file called a "home" page. From the home page, a visitor can access other files and applications at a Web site. A large Web site may utilize a number of servers, which may or may not be different and may or may not be geographically-dispersed. For example, the Web site of the International Business Machines Corporation (www.ibm.com) consists of thousands of Web pages and files spread out over multiple Web servers in locations world-wide.

A Web server (also referred to as an HTTP server) is a computer program that utilizes HTTP to serve files that form Web pages to Web clients. Exemplary Web servers are International Business Machines Corporation's family of Lotus Domino® servers and the Apache server (available from www.apache.org). A Web client is a requesting program that also utilizes HTTP. A browser is an exemplary Web client for use in requesting Web pages and files from Web servers. A Web server waits for a Web client, such as a browser, to open a connection and to request a specific web page or application. The Web server then sends a copy of the requested item to the Web client, closes the connection with the Web client, and waits for the next connection.

HTTP allows a browser to request a specific item, which a Web server then returns and the browser renders. To ensure that browsers and Web servers can interoperate unambiguously, HTTP defines the exact format of requests (HTTP requests) sent from a browser to a Web server as well as the format of responses (HTTP responses) that the Web server returns to the browser. Exemplary browsers include Netscape Navigator® (America Online, Inc., Dulles, Va.) and Internet Explorer® (Microsoft Corporation, Redmond, Wash.). Browsers typically provide a graphical user interface for retrieving and viewing Web pages, applications, and other resources served by Web servers.

The topology of many Web sites is becoming complex, especially Web sites involved in electronic commerce ("e-commerce"). Increasingly, Web sites are utilizing Web application servers and "back-end" servers to process Web client requests. A Web application server is a "middleman" server that operates between a Web server and one or more back-end servers, such as a database, transaction, or advertising server. An exemplary Web application server is the WebSphere® application server available from International Business Machines Corporation, Armonk, N.Y. Exemplary back-end servers include CICS, IBM DB2 Universal Database, and WebSphere Net.Commerce server, available from International Business Machines Corporation, Armonk, N.Y.

FIG. 1 illustrates a conventional Web site 10 having multiple Web servers 12a, 12b and 12c, and an application server 14. The illustrated Web site 10 also includes an Advertising server 16 and a Transaction server 18 which are back-end processing servers. As is understood by those of skill in the art, each Web server 12a, 12b, 12c is configured to receive client requests and issue responses thereto. Each Web server 12a, 12b, 12c is also configured to route requests to an Application server 14 for additional processing if necessary.

As illustrated in FIG. 1, Web servers 12a, 12b, 12c include respective log files 13a, 13b, 13c. In addition, the Application server 14, the Advertising server 16, and the Transaction server 18 each have respective.log files 15a, 15b, 15c as illustrated. As is known by those of skill in the art, a server log file may be utilized to store a record containing information about each transaction (i.e., requests and responses) handled by a respective server. For example, the log file 13a for Web server 12a may store a record for each request received from a client and each response issued to a client. The Application server 14 may store a record in its log file 15a for each request received from a Web server and stores a record for each response issued to a Web server. Similarly, the Advertising server and Transaction server may store records in their respective log files 15b, 15c for responses and requests to and from the Application server 14 or to and from another server or to a client.

Information contained within server log records is conventionally utilized to study the activities of Web site visitors (referred to a "psychographic" information). Analyzing and understanding Web site visitor psychographic information is becoming increasingly important to businesses operating on the Web. For example, the following psychographic information can be valuable: visitor identification, time of day a visitor accessed a Web site, an identification of each Web page requested by a visitor, how long a visitor spent viewing each Web page, and where the visitor came from (i.e., a referring URL). By analyzing Web site visitor psychographic information, a Web site owner can gain valuable insight into the effectiveness of a Web site in achieving its intended purpose. For example, a determination can be made as to what type of advertising should be placed on web pages that a particular type of visitor is likely to visit.

To accurately analyze psychographic information, it is desirable to be able to piece together a visitor's actions as a stream of requests into a unit called a session. A session starts the first time a visitor comes to a Web site and ends with an explicit log-out or an idle-time expiration. Unfortunately, analyzing psychographic information for Web site visitors can be difficult for complex Web sites, especially e-commerce Web sites that utilize multiple, different servers. A session can be difficult to accurately reconstruct from the records contained within multiple servers. This is because server log records for servers "downstream" from a Web server that has an established connection with a visitor's client typically are not linked to a visitor.

For example, a visitor of the Web site illustrated in FIG. 2 might submit a form to the first Web server 12a with a request that some action be performed on or with the data within the form. The first Web server 12a records the visitor's request in its log 13a and passes the data within the form to the Application server 14. The Application server 14 could invoke a servlet or other program that updates information in a database via the Transaction server 18. Under this scenario, the Application server 14 could record the invoked servlet (or other program) request from the first Web server 12a in its log 15a, and the Transaction server 18 could log the update to the database in its log 15c. In addition, the Advertising server 16 could be invoked by the Application server 14 to send coupons directly to the client 20. Under this scenario, the Advertising server could record in its log file 15b that coupons were sent to the client. Unfortunately, under existing server logging techniques, the log records of the Application server 14, the Transaction server 18 and the Advertising server 16 are typically not linked to the visitor who submitted the form, which is being logged by the Web server 12a.

SUMMARY OF THE INVENTION

In view of the above discussion, it is an object of the present invention to provide systems, methods and computer program products that may link all server transactions initiated by a Web site visitor to the visitor.

It is another object of the present invention to enhance psychographic analysis by enabling a session to be accurately reconstructed.

It is another object of the present invention to facilitate linking spare records among independent processes (servers).

These and other objects of the present invention are provided by systems, methods, and computer program products for linking a plurality of transactions performed by a plurality of servers at a Web site to a Web site visitor who initiates or is associated with the transactions. According to an embodiment of the present invention, when a Web server receives a client request from a Web site visitor for some action to be performed, the Web server stores a record of the client request in a log file and attaches a unique record identification (RID) to the record. The record stored in the Web server log includes information about the Web site visitor.

If the invocation of an application is required to respond to the client request, the Web server passes the unique RID to an Application server at the Web site along with the client request. The Application server stores a record of the Application server request in a log file associated with the Application server and attaches the RID to the record. The Application server may invoke one or more back-end servers to perform processing to satisfy the client request. The Application server passes the unique RID to a back-end server along with a request for the back-end server to perform an action. The back-end server stores a record of the Application server request in a log file associated with the back-end server and attaches the RID to the record.

To assist in the analysis of visitor activities at a Web site, the information stored within log records of the various servers having the same, unique RID can be combined. This combined information, thus, may represent the entirety of a visitor's activities at a Web site (i.e., a session) from the time of receipt of a client request to explicit log-out or idle time expiration.

DETAILED DESCRIPTION OF THE INVENTION

Figure 1:
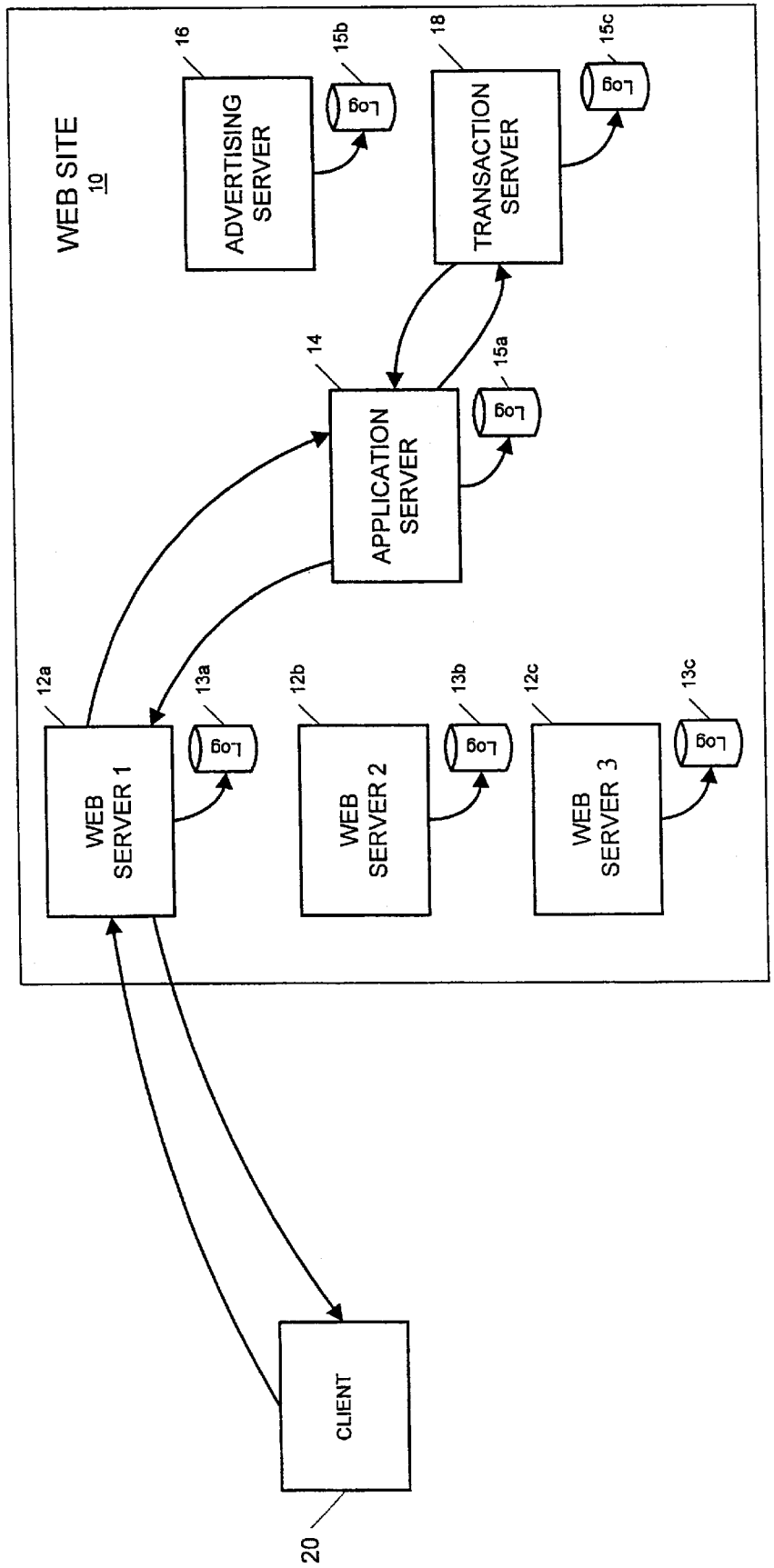
FIG. 1 illustrates a client in client/server communications with a Web server at a Web site having multiple Web servers, an Application server, and multiple back-end servers.
Figure 2:
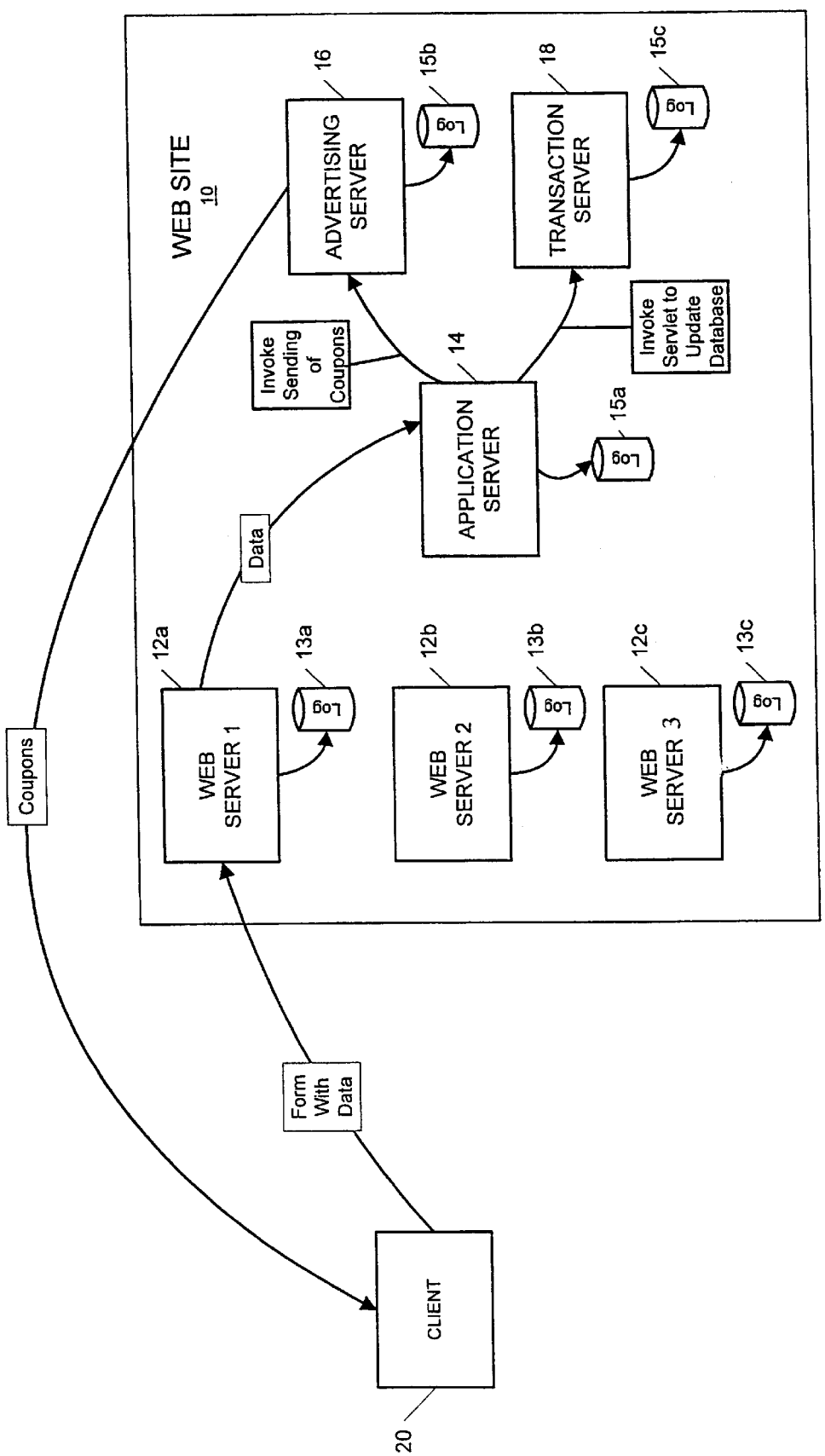
FIG. 2 illustrates various transactions performed by the Application server and back-end servers of FIG. 1 in response to a client request.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as JAVA®, Smalltalk or C++. However, the computer program code for carrying out operations of the present invention may also be written in conventional procedural programming languages, such as the "C" programming language, or in a functional (or fourth generation) programming language such as Lisp, SML, or Forth.

The present invention is described below with reference to block diagrams and/or flowchart illustrations of methods, apparatus (systems) and computer program products according to an embodiment of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Figure 3:
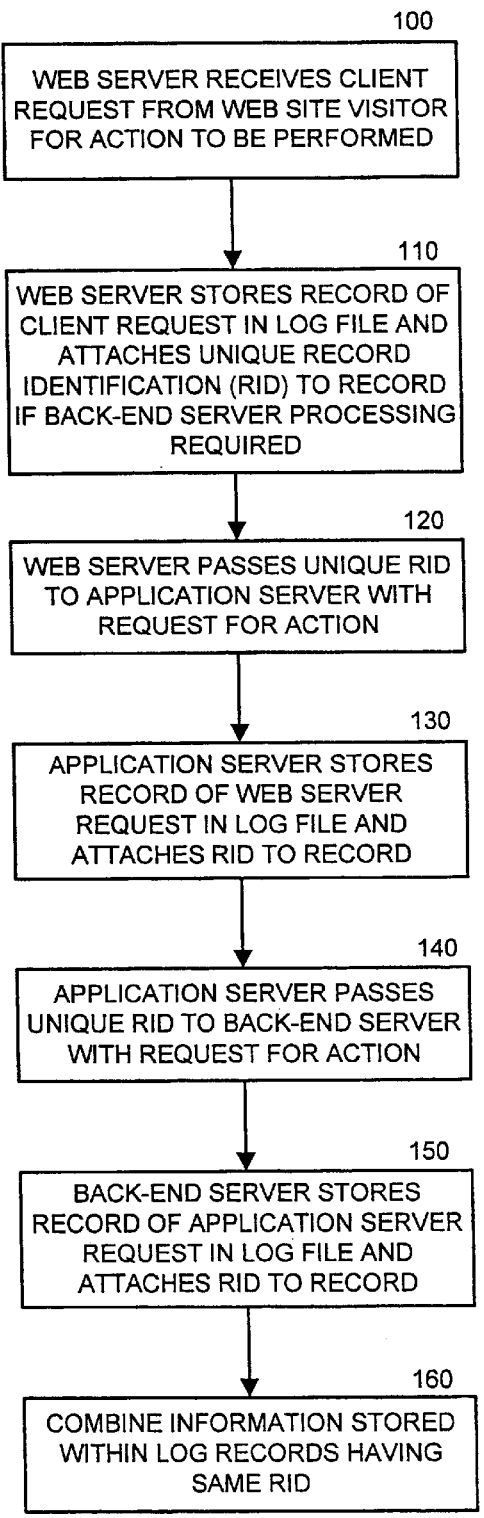
FIG. 3 is a flow chart illustrating operations for linking a plurality of transactions performed by a plurality of servers at a Web site to a Web site visitor according to the present invention.

The present invention provides methods, systems and computer program products for linking a plurality of transactions performed by a plurality of servers at a Web site to a Web site visitor who initiates or is associated with the transactions. Referring to FIG. 3, a Web server receives a client request from a Web site visitor for some action to be performed (Block 100). The Web server stores a record of the client request in a log file associated with the Web server and attaches a unique record identification (RID) to the record (Block 110) if the request requires further processing by other backend servers. The term "unique RID" as used herein can mean that a RID is different from other RIDs for an indefinite period of time or, alternatively, for only specified periods of time that can be user-defined.

The record stored in the Web server log includes information about the Web site visitor. An exemplary Web server log record may include information about a requesting client, the time of the client request, an identification of information being requested by the client, and information about where the client request is originating from. Web server log records and their use are well understood by those of skill in the art and need not be described further herein. Information about Web server log records is available from the World Wide Web Consortium which is located at http://www.w3.org/.

If the invocation of an application is required to respond to the client request, the HTTP server passes the unique RID to an Application server at the Web site along with the client request (Block 120). The Application server stores a record of the Application server request in a log file associated with the Application server and attaches the RID to the record (Block 130). As is understood by those of skill in the art, an Application server log record conventionally does not contain any information about a Web site visitor making a client request.

The Application server may invoke one or more back-end servers to perform processing to satisfy the client request. The Application server passes the unique RID to a back-end server along with a request for the back-end server to perform an action (Block 140). The back-end server stores a record of the Application server request in a log file associated with the back-end server and attaches the RID to the record (Block 150). As is understood by those of skill in the art, a back-end server log record conventionally does not contain any information about a Web site visitor making a client request.

To assist in the analysis of visitor activities at a Web site, the information stored within log records of the various servers having the same, unique RID can be combined (Block 160). This combined information, thus, represents the entirety of a visitor's activities at a Web site (i.e., a session) from the time of receipt of a client request to explicit log-out or idle time expiration.

Figure 4:
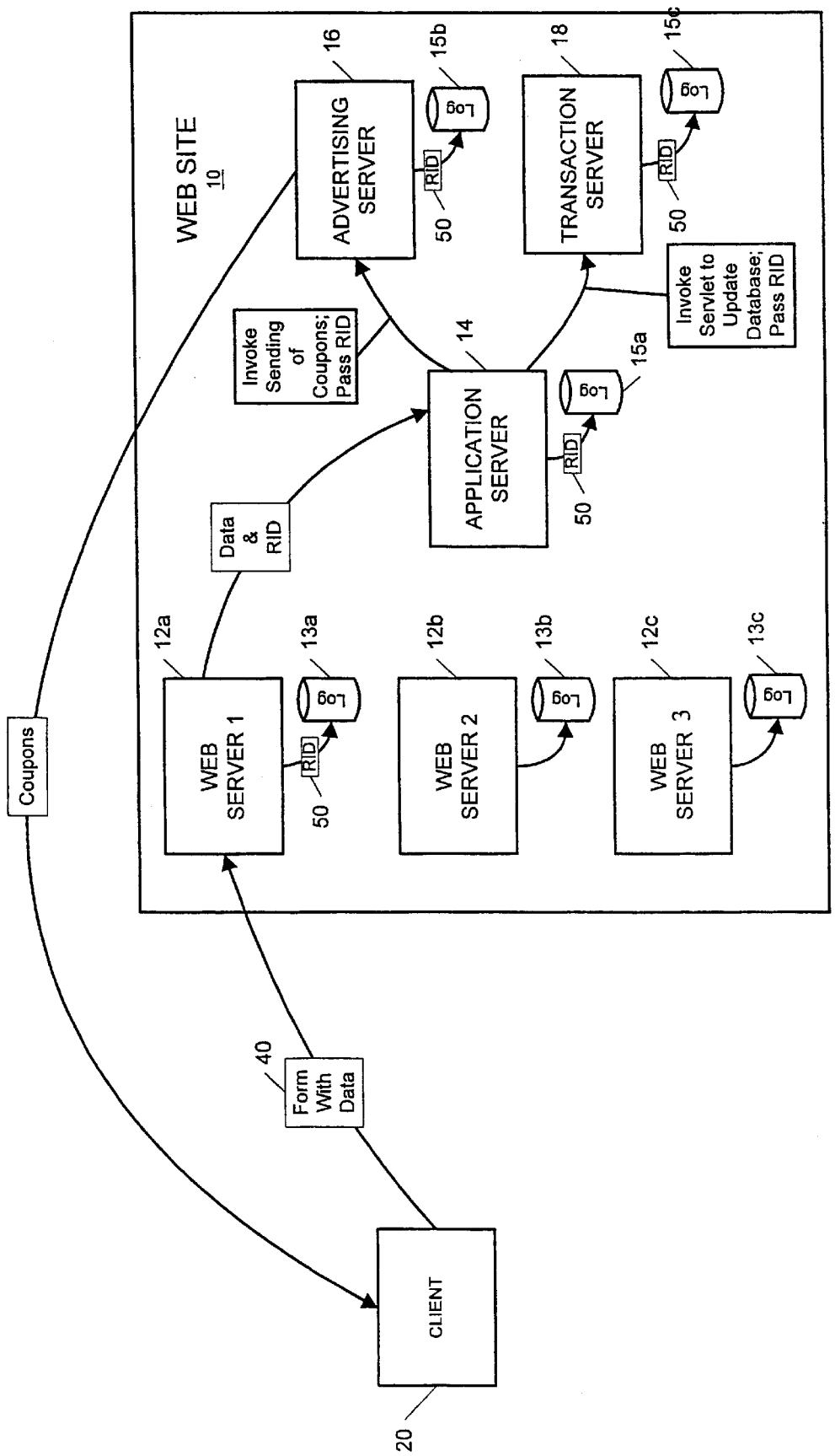
FIG. 4 illustrates passing a unique record identification (RID) with each request made downstream of a Web server according to the present invention.

Referring now to FIG. 4, the passing of a unique record identification (RID) to various Web site servers downstream from a Web server according to the present invention is schematically illustrated. A form 40 is submitted to a Web server 12a via a client 20 with a request to perform some action on or with data contained within the form. The Web server 12a stores a record of the client request with a RID 50 in its log 13a. The Web server 12a passes a request for some action to the Application server 14 along with the RID 50. The Application server 12a stores a record of the Web server request with the RID in its log 15a.

The Application server 12a passes data from the submitted form to the Transaction server 18 along with the unique RID 50. The Application server 12a also passes data from the submitted form to the Advertising server 16 along with the unique RID 50. The Transaction server 18 stores the unique RID 50 with a record of the Application server request in its log 15c. The Advertising server 16, which sends coupons directly to the client in response to the client request, stores the unique RID 50 with a record of the Application server request in its log 15b.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of linking a plurality of transactions performed by a plurality of servers at a Web site to a Web site visitor who initiates the plurality of transactions, the method comprising the steps of:

receiving a client request from the Web site visitor at a first server of the Web site;

storing a first record of the client request in a first log file associated with the first server, wherein a record identification (RID) associated with the client request is attached to the first record, and wherein the first record contains information about the Web site visitor;

passing the RID from the first server to a second server at the Web site along with a request for the second server to perform an action responsive to the client request; and storing a second record of the second server action in a second log file associated with the second server, wherein the RID is attached to the second record, and wherein the second record does not contain information about the Web site visitor.

2. A method according to claim 1 further comprising the steps of:
  passing the RID from the second server to a third server at the Web site along with a request for the third server to perform an action responsive to the client request; and
  storing a third record of the third server action in a third log file associated with the third server, wherein the RID is attached to the third record, and wherein the third record does not contain information about the Web site visitor.

3. A method according to claim 1 wherein the first server is a Web server and wherein the second server is an Application server.

4. A method according to claim 2 wherein the third server is a back-end server.

5. A method according to claim 2 wherein the third server is a back-end server selected from the group consisting of database servers, advertising servers and transaction servers.

6. A method according to claim 1 further comprising the step of combining information stored within the first and second records having the same RID to create a session that identifies activities of the Web site visitor at the Web site.

7. A method according to claim 2 further comprising the step of combining information stored within the first, second and third records having the same RID to create a session that identifies activities of the Web site visitor at the Web site.

8. A method of linking a plurality of transactions performed by a plurality of servers at a Web site to a Web site visitor who initiates the plurality of transactions, the method comprising the steps of:
  receiving a client request from the visitor at a first server of the Web site, wherein the first server is a HTTP server;
  storing a first record of the client request in a first log file associated with the first server, wherein an unique record identification (RID) is attached to the first record, and wherein the first record contains information about the visitor;
  passing the unique RID from the first server to a second server at the Web site along with a request for the second server to perform an action, wherein the second server is an Application server;
  storing a second record of the second server action in a second log file associated with the second server, wherein the unique RID is attached to the second record, and wherein the second record does not contain information about the visitor;
  passing the unique RID from the second server to a third server at the Web site along with a request for the third server to perform an action, wherein the third server is a back-end server; and
  storing a third record of the third server action in a third log file associated with the third server, wherein the unique RID is attached to the third record, and wherein the third record does not contain information about the visitor.

9. A method according to claim 8 wherein the third server is a back-end server selected from the group consisting of database servers, advertising servers and transaction servers.

10. A method according to claim 8 further comprising the step of combining information stored within the first, second and third records to create a session that identifies activities of the Web site visitor at the Web site.

11. A system for linking a plurality of transaction performed by a plurality of servers at a Web site to a Web site visitor who initiates the plurality of transactions, comprising:
  means for receiving a client request from the Web site visitor at a first server of the Web site;
  means for storing a first record of the client request in a first log file associated with the first server, wherein an unique record identification (RID) is attached to the first record, and wherein the first record contains information about the Web site visitor;
  means for passing the unique RID from the first server to a second server at the Web site along with a request for the second server to perform an action; and
  means for storing a second record of the second server action in a second log file associated with the second server, wherein the unique RID is attached to the second record, and wherein the second record does not contain information about the Web site visitor.

12. A system according to claim 11 further comprising:
  means for passing the unique RID from the second server to a third server at the Web site along with a request for the third server to perform an action; and
  means for storing a third record of the third server action in a third log file associated with the third server, wherein the unique RID is attached to the third record, and wherein the third record does not contain information about the Web site visitor.

13. A system according to claim 11 wherein the first server is a Web server and wherein the second server is an Application server.

14. A system according to claim 12 wherein the third server is a back-end server.

15. A system according to claim 12 wherein the third server is a back-end server selected from the group consisting of database servers, advertising servers and transaction servers.

16. A system according to claim 11 further comprising means for combining information stored within the first and second records to create a session that identifies activities of the Web site visitor at the Web site.

17. A system according to claim 12 further comprising means for combining information stored within the first, second and third records to create a session that identifies activities of the Web site visitor at the Web site.

18. A system for linking a plurality of transactions performed by a plurality of servers at a Web site to a Web site visitor who initiates the plurality of transactions, comprising:
  means for receiving a client request from the visitor at a first server of the Web site, wherein the first server is a HTTP server;
  means for storing a first record of the client request in a first log file associated with the first server, wherein an unique record identification (RID) is attached to the first record, and wherein the first record contains information about the visitor;
  means for passing the unique RID from the first server to a second server at the Web site along with a request for the second server to perform an action, wherein the second server is an Application server;
  means for storing a second record of the second server action in a second log file associated with the second server, wherein the unique RID is attached to the second record, and wherein the second record does not contain information about the visitor;
  means for passing the unique RID from the second server to a third server at the Web site along with a request for the third server to perform an action, wherein the third server is a back-end server; and means for storing a third record of the third server action in a third log file associated with the third server, wherein the unique RID is attached to the third record, and wherein the third record does not contain information about the visitor.

19. A system according to claim 18 wherein the third server is a back-end server selected from the group consisting of database servers, advertising servers and transaction servers.

20. A system according to claim 18 further comprising means for combining information stored within the first, second and third records to create a session that identifies activities of the Web site visitor at the Web site.

21. A computer program product for plurality of transactions performed by a plurality of servers at a Web site to a Web site visitor who initiates the plurality of transactions, the computer program product comprising a computer usable storage medium having computer readable program code means embodied in the medium, the computer readable program code means comprising:

computor readable program code means for recieving a client request from the Web site visitor at a first server of the Web site;

computer readable program code means for storing a first record of the client request in a first log file associated with the first server, wherein an unique record identification (RID) is attached to the first record, and wherein the first record contains information about the Web site visitor;

computer readable program code means for passing the unique RID from the first server to a second server at the Web site along with a request for the second server to perform an action; and computer readable program code means for storing a second record of the second server action in a second log file associated with the second server, wherein the unique RID is attached to the second record, and wherein the second record does not contain information about the Web site visitor.

22. A computer program product according to claim 21 further comprising:

computer readable program code means for passing the unique RID from the second server to a third server at the Web site along with a request for the third server to perform an action; and computer readable program code means for storing a third record of the third server action in a third log file associated with the third server, wherein the unique RID is attached to the third record, and wherein the third record does not contain information about the Web site visitor.

23. A computer program product according to claim 21 wherein the first server is a Web server and wherein the second server is an Application server.

24. A computer program product according to claim 22 wherein the third server is a back-end server.

25. A computer program product according to claim 22 wherein the third server is a back-end server selected from the group consisting of database servers, advertising servers and transaction servers.

26. A computer program product according to claim 21 further comprising computer readable program code means for combining information stored within the first and second records to create a session that identifies activities of the Web site visitor at the Web site.

27. A computer program product according to claim 22 further comprising computer readable program code means for combining information stored within the first, second and third records to create a session that identifies activities of the Web site visitor at the Web site.

28. A computer program product for linking a plurality of transactions performed by a plurality of servers at a Web site to a Web site visitor who initiates the plurality of transactions, the computer program product comprising a computer usable storage medium having computer readable program code means embodied in the medium, the computer readable program code means comprising:

computer readable program code means for receiving a client request from the visitor at a first server of the Web site, wherein the first server is a HTTP server;

computer readable program code means for storing a first record of the client request in a first log file associated with the first server, wherein an unique record identification (RID) is attached to the first record, and wherein the first record contains information about the visitor;

computer readable program code means for passing the unique RID from the first server to a second server at the Web site along with a request for the second server to perform an action, wherein the second server is an Application server;

computer readable program code means for storing a second record of the second server action in a second log file associated with the second server, wherein the unique RID is attached to the second record, and wherein the second record does not contain information about the visitor;

computer readable program code means for passing the unique RID from the second server to a third server at the Web site along with a request for the third server to perform an action, wherein the third server is a back-end server; and computer readable program code means for storing a third record of the third server action in a third log file associated with the third server, wherein the unique RID is attached to the third record, and wherein the third record does not contain information about the visitor.

29. A computer program product according to claim 28 wherein the third server is a back-end server selected from the group consisting of database servers, advertising servers and transaction servers.

30. A computer program product according to claim 28 further comprising computer readable program code means for combining information stored within the first, second and third records to create a session that identifies activities of the Web site visitor at the Web site.

* * * * *